Sept. 2, 1952      E. R. ROSS      2,609,066
BRAKE
Filed April 14, 1947
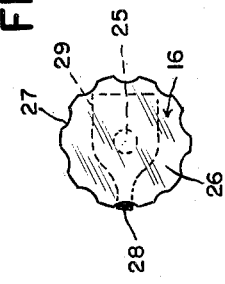
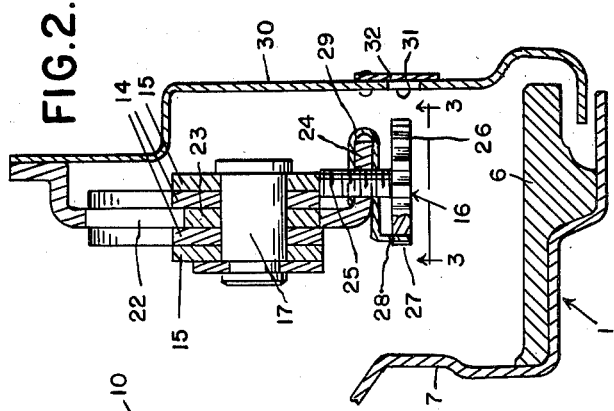
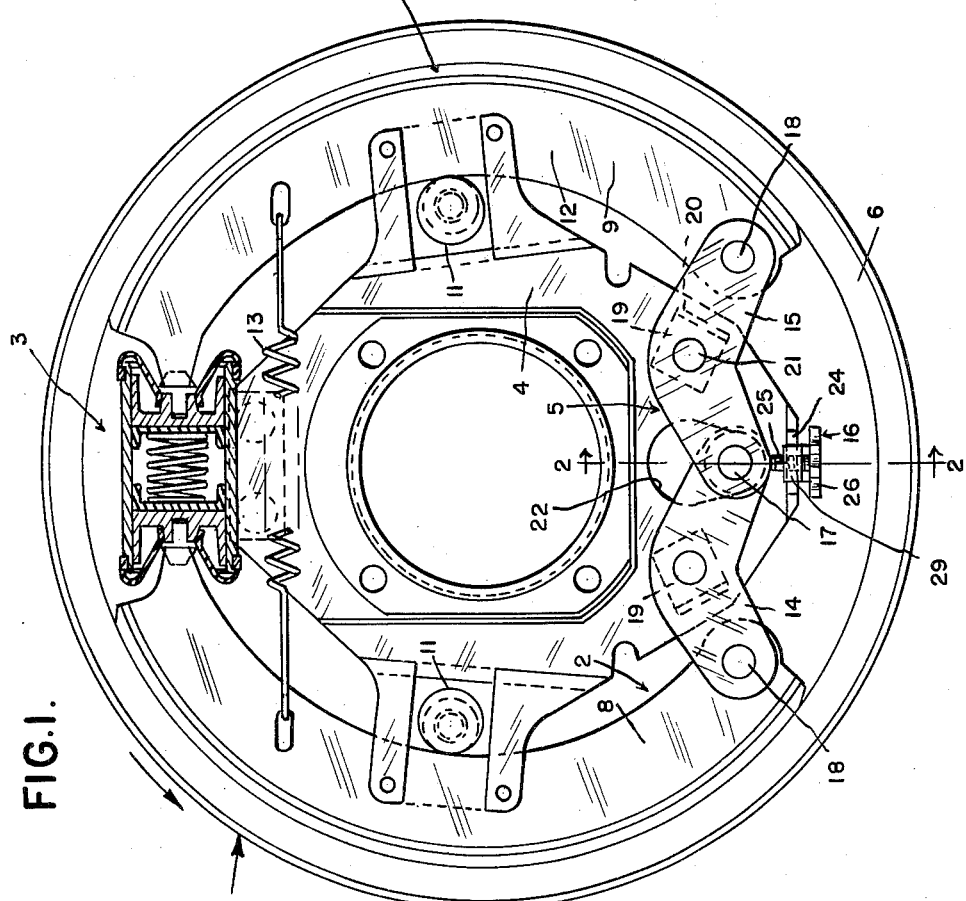
INVENTOR.
ELMER R. ROSS
BY
ATTORNEYS Patented Sept. 2, 1952

2,609,066

UNITED STATES PATENT OFFICE 2,609,066

BRAKE

Elmer R. Ross, Detroit, Mich., assignor to Kelsey-Hayes Wheel Company, Detroit, Mich., a corporation of Delaware Application April 14, 1947, Serial No. 741,375

5 Claims. (Cl. 188—78)

The invention relates to brakes and refers more particularly to brakes of that type having a brake drum and a friction member engageable with the drum.

The invention has for one of its objects to provide an improved brake having means movable relative to a support for anchoring the friction member when in engagement with the drum and adjustable relative to the support for adjustably positioning the friction member when retracted.

The invention has for another object to provide an improved brake in which the anchoring and positioning means serves to move one of a pair of brake shoes comprising the friction member into engagement with the drum when the other of the brake shoes is moved into engagement with the drum.

The invention has for further objects to provide an improved anchoring and adjusting means and to provide a simple construction for adjusting the means.

With these as well as other objects in view, the invention resides in the novel features of construction, combination and arrangements of parts as more fully hereinafter set forth.

In the drawings:

Figure 1 is a side elevation partly broken away of a brake embodying the invention;

Figure 2 is a cross section on the line 2—2 of Figure 1;

Figure 3 is a cross section on line 3—3 of Figure 2.

In general, the brake comprises the brake drum 1, the friction member 2 engageable with the drum, the actuator 3 for moving the friction member into engagement with the drum to apply the brake, the anchor plate 4 and the anchoring and positioning means 5 for the friction member.

The brake drum has the annular brake flange 6 and the web 7, the latter being secured to the member to be braked such as a motor vehicle wheel. The friction member comprises the pair of brake shoes 8 and 9 within the drum, the brake shoes being preferably of T-shaped cross-section and having the linings 10 for engaging the internal face of the annular flange 6.

The actuator as shown is a wheel cylinder mounted on the anchor plate 4 and located between the adjacent upper ends of the brake shoes 8 and 9. The anchor plate has mounted thereon the rotatably adjustable eccentrics 11 which are engageable with the radially inner edges of the webs 12 of the brake shoes 8 and 9 in the retracted positions of the brake shoes, the retracting being accomplished upon relieving the pressure of the braking liquid within the wheel cylinder by the coil spring 13 having its opposite ends connected to the brake shoes.

The anchoring and positioning means for the brake shoes comprises the pairs of bell crank levers 14 and 15 and the adjustable screw 16 mounted on the anchor plate. The levers of each pair are at opposite sides of the anchor plate 4 and the webs 12 of the brake shoes, these levers being pivotally connected to each other at their adjacent overlapping ends by the pin 17 and to the brake shoes at their remote ends by the pins 18. The levers are also floatingly guided by the anchor plate intermediate their ends by the slides 19 slidable in the openings 20 formed in the anchor plate. The levers are pivotally connected to the slides by the pins 21 which preferably extend through the levers at their knees. The levers are alike and balanced to anchor the brake shoes when the brake is applied. The anchor plate is provided with the opening 22 the lower portion of the edge of which is engageable by the roller 23 mounted on the pivot pin 17 to initially center the levers in retracted or released position. The anchor plate is also provided below the opening with the transverse flange 24 which is threadedly engaged by the shank 25 of the screw 16, the end of the shank being engageable with the adjacent ends of the bell crank levers 14 and 15 in the retracted positions of the brake shoes. The head 26 of the screw preferably has the peripheral recesses 27 resiliently engaged by the tongue 28 of the spring 29 which embraces the transverse flange 24 and is secured in place by the screw shank 25, the spring serving to retain the screw in its various positions of angular adjustment. The coverplate 30 for closing the brake drum is formed with the opening 31 through which a suitable tool, such as a screw driver, may be inserted to angularly adjust the screw 16. This opening is normally closed by the plate 32 pivoted to the coverplate.

Assuming the brake drum 1 to be rotating in the direction of the arrow in Figure 1, it will be seen that when the braking liquid under pressure is forced into the wheel cylinder 3 the upper ends of the brake shoes 8 and 9 will be moved into engagement with the annular flange 6 of the brake drum and that the brake shoe 8 compels the bell crank levers 14 to swing in a counter clockwise direction about their pivot pin 21. The inner ends of these bell crank levers 14 act through the pivot pin 17 upon the inner ends of the bell crank levers 15 thereby compelling the latter to swing in a clockwise direction about their pivot pin 21. This results in moving the lower or leading end of the brake shoe 9 into engagement with the brake drum and in a direction opposite to its direction of rotation. The levers 14 and 15 are free to float toward the right and then toward the left during their swinging movement in applying the brake. The construction is such that the levers exert equal forces on the brake shoes 8 and 9 and serve to anchor the brake shoes when the brake is applied. Upon relieving the liquid pressure in the wheel cylinder the retracting spring 13 returns the brake shoes 8 and 9 and also the bell crank levers 14 and 15 to positions determined by the eccentrics 11, the edge of the opening 22 in the plate 4 and the screw 16, the eccentrics and screw being manually adjustable to secure predetermined clearance between the brake linings of the brake shoes and the internal face of the annular flange of the brake drum.

What I claim as my invention is:

1. A brake comprising a brake drum, a pair of brake shoes engageable with said drum, a plate, an actuator operatively connected to adjacent ends of said shoes, means for anchoring said shoes when in engagement with said drum and for adjustably positioning said shoes when retracted, said means comprising levers movably mounted on said plate and operatively connected to each other and said shoes at points circumferentially spaced from said adjacent ends, and radially adjustable means engageable with one of said levers for positioning said levers relative to said plate and each other when said shoes are retracted.

2. A brake comprising a brake drum, a pair of internal brake shoes engageable with said drum, a plate, an actuator operatively connected to adjacent ends of said shoes, means for anchoring said shoes when in engagement with said drum and for adjustably positioning said shoes when retracted, said means comprising levers mounted intermediate their ends on said plate and operatively connected at their adjacent ends to each other and at their remote ends to said shoes remote from said adjacent ends thereof and a radially adjustable stop upon said plate engageable with an adjacent end of one of said levers for positioning said adjacent ends of said levers with respect to said plate to position said shoes in the retracted position thereof.

3. A brake comprising a brake drum, a pair of internal brake shoes engageable with said drum, a plate, an actuator between adjacent ends of said brake shoes and means at the opposite ends of said shoes for anchoring said shoes when in engagement with said drum and for adjustably positioning the last mentioned ends of said shoes when retracted, said means comprising bell cranks operatively connected at their adjacent ends to each other and at their remote ends to the last mentioned ends of said shoes and floatingly guided intermediate their ends by said plate, said bell cranks cooperating to move one of said shoes into engagement with said drum upon engagement of the other of said shoes with said drum and a screw radially adjustably mounted upon said plate and engageable with an adjacent end of one of said bell cranks for positioning the adjacent ends of said bell cranks to position the last mentioned ends of said shoes with respect to said drum.

4. A brake comprising a brake drum, a pair of internal brake shoes engageable with said drum, an actuator between adjacent ends of said shoes, a plate, levers floatingly guided intermediate their ends by said plate and having adjacent ends pivotally connected to each other and remote ends pivotally connected to said shoes remote from said adjacent ends of said shoes and a screw radially adjustably mounted upon said plate and engageable with said adjacent ends of said levers for positioning said last mentioned adjacent ends.

5. A brake comprising a brake drum, a pair of internal brake shoes engageable with said drum, an actuator between adjacent ends of said shoes, a plate having a flange diametrically opposite said actuator, levers having adjacent ends pivotally connected to each other diametrically opposite said actuator and remote ends pivotally connected to said shoes remote from said adjacent ends of said shoes, said levers being floatingly guided intermediate their ends by said plate, a screw having a shank threadedly engaging said flange of said plate and engageable with said adjacent ends of said levers, said screw having a head formed with peripheral recesses and a spring member secured to said flange of said plate by said screw shank and having a portion resiliently engaging a recess of said screw head.

ELMER R. ROSS.

REFERENCES CITED

The following references are of record in the file of this patent:

UNITED STATES PATENTS

| Number | Name | Date |
|---|---|---|
| 1,875,523 | Taylor | Sept. 6, 1932 |
| 1,992,207 | Goepfrich | Feb. 26, 1935 |
| 2,022,435 | Sanford | Nov. 26, 1935 |
| 2,024,808 | Sawtelle | Dec. 17, 1935 |
| 2,057,847 | Sawtelle et al. | Oct. 20, 1936 |
| 2,431,441 | Willis | Nov. 25, 1947 |

FOREIGN PATENTS

| Number | Country | Date |
|---|---|---|
| 320,709 | Great Britain | Oct. 24, 1929 |
| 37,395 | France | Aug. 26, 1930 |